US009400727B2

(12) United States Patent  
Barak et al.

(10) Patent No.: US 9,400,727 B2
(45) Date of Patent: Jul. 26, 2016

(54) AGENTLESS RECORDING FOR VIRTUAL MACHINE CONSOLES

(75) Inventors: Nir Barak, Karmi Yosef (IL); Itzhak Fadida, Haifa (IL); Amir Jerbi, Givatayim (IL)

(73) Assignee: CA, Inc., New York, NY (US)

( * ) Notice: Subject to any disclaimer, the term of this patent is extended or adjusted under 35 U.S.C. 154(b) by 819 days.

(21) Appl. No.: 13/472,157

(22) Filed: May 15, 2012

(65) Prior Publication Data

US 2013/0307970 A1   Nov. 21, 2013

(51) Int. Cl.
| | |
|---|---|
| G06F 9/455 | (2006.01) |
| G06F 11/30 | (2006.01) |
| H04N 5/77 | (2006.01) |
| G06F 21/53 | (2013.01) |
| H04N 21/2743 | (2011.01) |
| H04N 21/2747 | (2011.01) |

(52) U.S. Cl.
CPC ........ *G06F 11/3003* (2013.01); *G06F 11/3093* (2013.01); *G06F 21/53* (2013.01); *H04N 5/77* (2013.01); *G06F 2201/815* (2013.01); *G06F 2221/2101* (2013.01); *G06F 2221/2149* (2013.01); *H04N 21/2743* (2013.01); *H04N 21/2747* (2013.01)

(58) Field of Classification Search
None
See application file for complete search history.

(56) References Cited

U.S. PATENT DOCUMENTS

| | | | |
|---|---|---|---|
| 6,748,430 B1 * | 6/2004 | Johnson ................ | G06F 13/107 709/223 |
| 2009/0182928 A1 * | 7/2009 | Becker ................ | G06F 9/45558 711/6 |
| 2010/0174992 A1 * | 7/2010 | Portman et al. ............... | 715/738 |
| 2011/0167494 A1 * | 7/2011 | Bowen et al. .................. | 726/24 |
| 2013/0152194 A1 * | 6/2013 | Barak et al. .................... | 726/21 |

OTHER PUBLICATIONS

Plisko, C. "Options for User Uditing on Linuxand Solaris Platforms" Whitepaper, www.observeit.com Jan. 2012.
"People Auditing: Why Are We Ignoring the #1 Cause of Downtime and Security Breaches" A Troubleshooting Process Whitepaper, observeit-sys.com Mar. 2008.
Petri, D. "Remote Vendor Monitoring: How to Record All Remote Access (via SSL VPN Gateway Sessions)" an ObserveIT Whitepaper Mar. 2008.
Remote Desktop Protocol [online]. Microsoft Corporation [retrieved on Jun. 9, 2015]. Retrieved from the Internet: <URL: msdn.microsoft.com/en-us/library/aa383015(v-vs.85).aspx>, 1 page.
Liao, X., Jin, H., Hu, L. & Liu, H., *Towards virtualized desktop environment*, 22 Concurrency and Computation: Practice and Experience (Mar. 25, 2010), pp. 419-440, 22 pages.

* cited by examiner

*Primary Examiner* — Mengyao Zhe
(74) *Attorney, Agent, or Firm* — Myers, Bigel & Sibley, P.A.

(57) ABSTRACT

A virtual machine console is recorded. A method for monitoring a virtual machine may comprise monitoring a virtualization environment, detecting a new virtual machine and associated console, creating an additional instantiation of the console by generating a reflection of the console on a video capture device and recording a real time video of an image of the additional instantiation of the console on the video capture device. Prior to recording, the image may be analyzed to determine a change and the recording of the image can be triggered based upon the analysis.

21 Claims, 8 Drawing Sheets

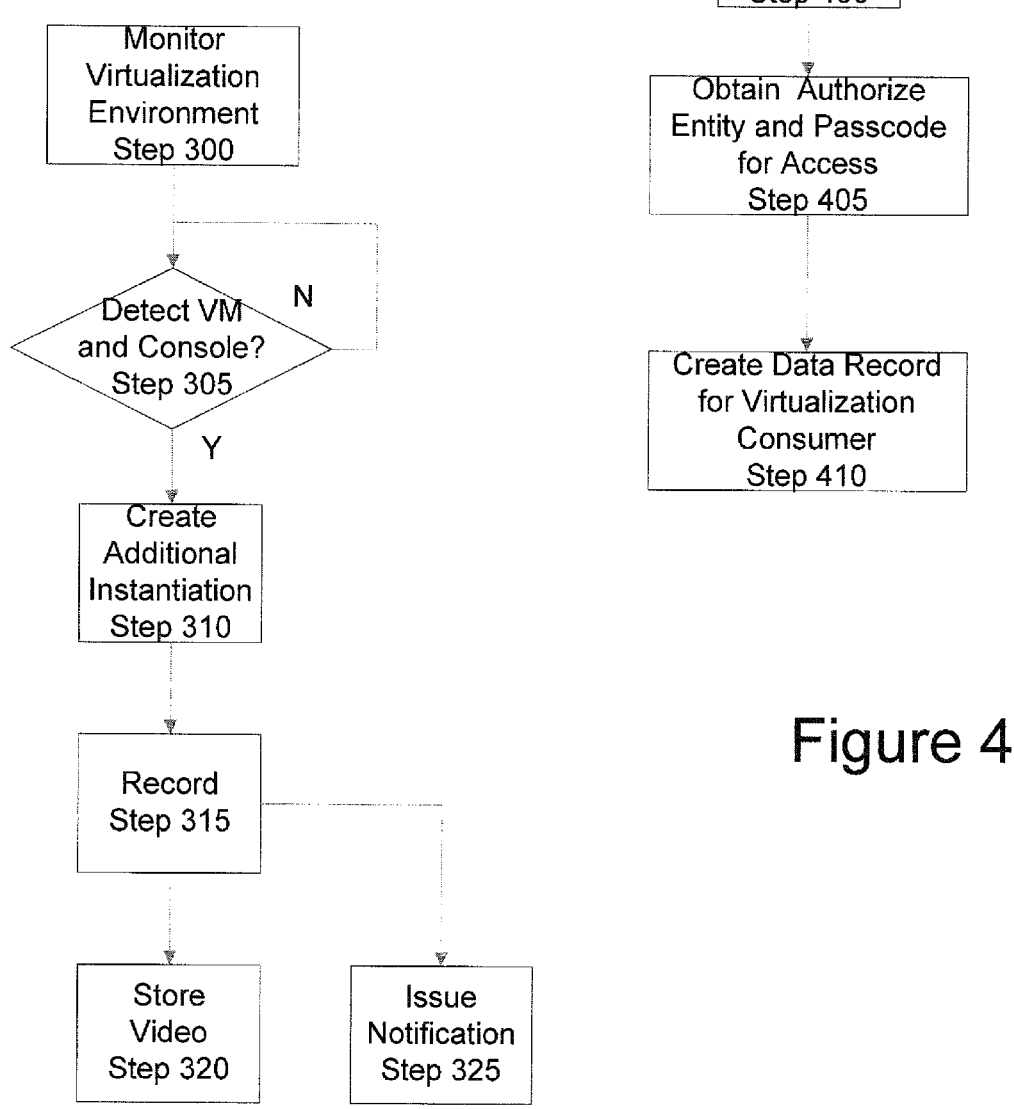

AGENTLESS RECORDING FOR VIRTUAL MACHINE CONSOLES

BACKGROUND

Aspects of the present disclosure relates generally to the field of virtual machines and more particularly to recording real-time videos of virtual machine consoles.

Cloud computing and virtual machines (VM) are used by enterprises to access software applications and perform a wide variety of computing functions. Management and security issues are important concerns in the virtual machine environment. The problem is exacerbated because virtualization environment administrators are usually not the VM owners; therefore, they can get access to VM consoles they do not own. When a customer receives a VM in the cloud, the VM console can be accessed by the virtualized environment administrators, potentially exposing the data for access from the virtualized environment management system. Further, while using the VM console, someone may view everything they do on the console. For example, when the current VM owner uses the console, someone may open it, view the console and potentially may even alter data currently put in. Moreover, someone with access to the virtualization environment can directly open and work on the VM console.

BRIEF SUMMARY

Disclosed is a method for monitoring a virtual machine comprising monitoring a virtualization environment, detecting a new virtual machine and associated console, creating an additional instantiation of the console by generating a reflection of the console on a video capture device and recording a real time video of an image of the additional instantiation of the console on the video capture device. The virtualization environment is provided by a virtualization provider.

Also disclosed is a virtual image capture device comprising a console monitor configured to detect a new virtual machine console, a replication unit configured to create one instantiation of the detected console by generating a reflection of the console; and a recording unit configured to record a real time video an image of the reflected console.

Also disclosed is a computer program product. The computer program product comprise a computer readable storage medium having computer readable program code embodied therewith, the computer readable program code. The computer readable program code comprises code configured to monitor a virtualization environment, the virtualization environment is provided by a virtualization provider, to detect a new virtual machine and associated console; to create an additional instantiation of the console by generating a reflection of the console on a video capture device, and to record a real time video of an image of the additional instantiation of the console on the video capture device.

Also disclosed is a computer program product. The computer program product comprise a computer readable storage medium having computer readable program code embodied therewith, the computer readable program code. The computer readable program code comprises code configured to instruct a first program to monitor a virtualization environment and to detect a new virtual machine and associated console, to instruct a second program to create an additional instantiation of the console by generating a reflection of the console on a video capture device based upon the detection, and to instruct a third program to record a real time video of an image of the additional instantiation of the console on the video capture device when the reflection is created.

BRIEF DESCRIPTION OF THE DRAWINGS

FIG. 3 is a flow diagram of an example of a recording method in accordance with an aspect of the disclosure;

FIG. 4 is a flow diagram of an example of a customer registration method in accordance with an aspect of the disclosure;

DETAILED DESCRIPTION

The aspects of the present disclosure provide an agentless manner to record a real time video of virtual machine console (s).

Figure 1:
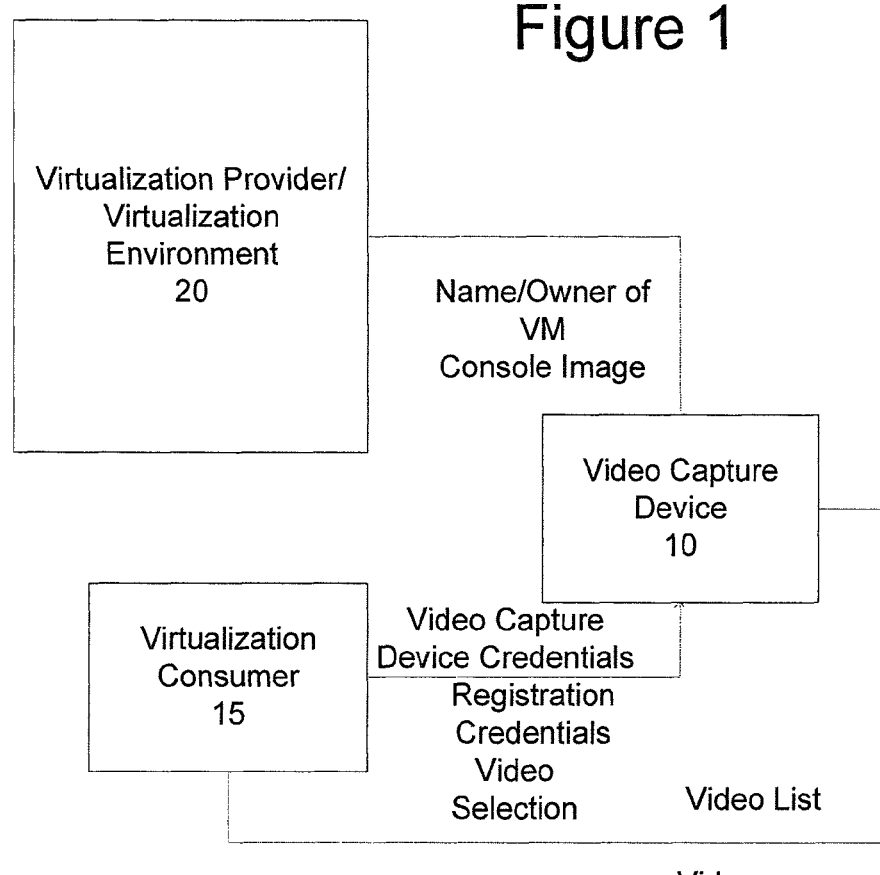
FIG. 1 is a block diagram of an example of a video recording system in accordance with an aspect of the disclosure.

FIG. 1 is a block diagram of an embodiment of the video recording system in according with an aspect of the disclosure. The system 50 includes a video capture device 10 (which will be described in detailed later), a virtualization provider 20 associated with a specific virtualization environment. Virtual machines ("VMs") are also provided within the virtualization environment. The virtualization provider 20 provides the Video Capture Device 10 with information associated with VMs running in its virtualization environment. The information includes the name of the virtual machine and owner of the machine. Additionally, the virtualization provider gives access to an image of a virtual machine console to the Video Capture Device 10.

The virtualization consumer 15("consumer") can be the owner of one or more VMs in the virtualization environment. The consumer 15 registers with the video capture device 10 to have any console associated with its VMs recorded by creating an account. The registration process will be described with respect to FIG. 4. During the registration process, the consumer 15 provides the video capture device 10 with registration credentials and video capture device credentials. The video capture device credentials are used by the video capture device 10 if the VM is secure. The registration credentials are used by the video capture device 10 to determine if a person requesting access to a recorded video is the authorized owner or entity. FIG. 1 depicts one provider 20 and customer 15; however, there can be any number of providers and customers.

Figure 2:
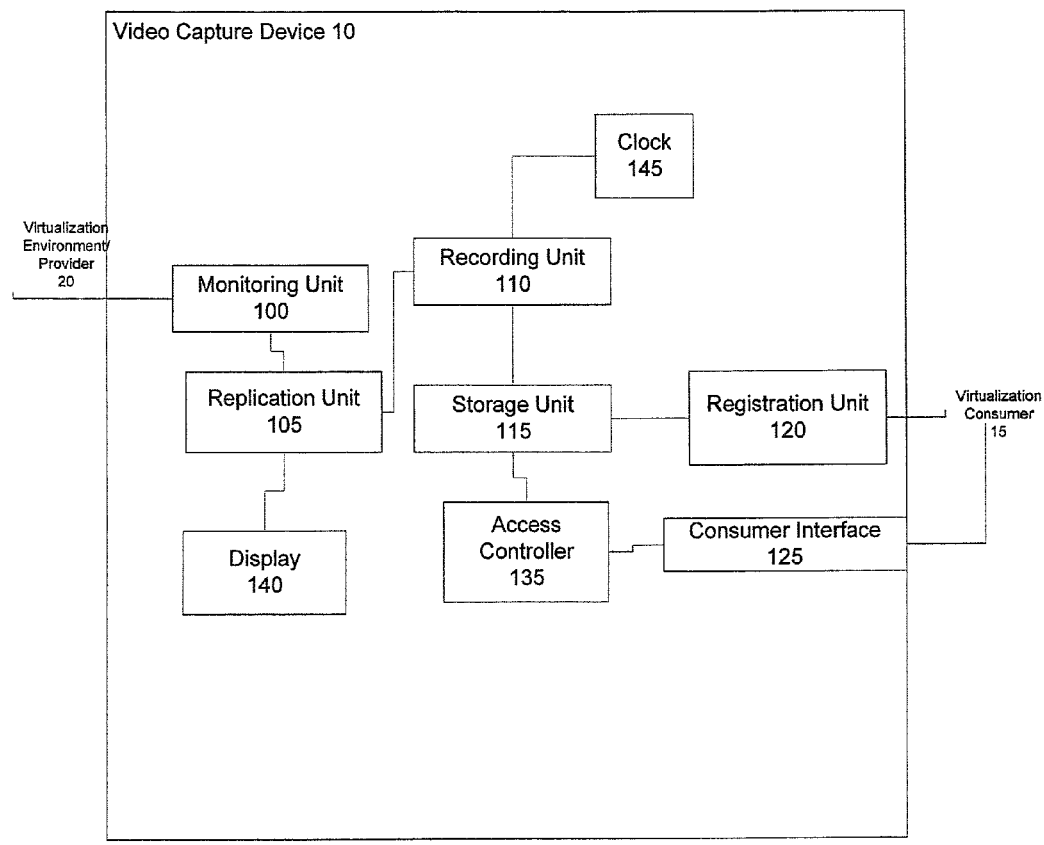
FIG. 2 is a block diagram of an example of a Video Capture Device in accordance with an aspect of the disclosure.

FIG. 2 illustrates a block diagram of the video capture device 10. The video capture device 10 includes a Monitoring Unit 100, a Replication Unit 105, a Recording Unit 110, a Storage Unit 115, a Registration Unit 120, a Consumer Interface 125, an Access Controller 135, a Display 140 and a Clock 145.

The Storage Unit 115 is configured to store at least the recorded videos. Additionally, the Storage Unit 115 includes a registration file for each consumer 15. The registration file can be in the foitn of a data record. The Storage Unit 115 can be any known storage device such as, but not limited to, magnetic, optical, electronic, electromagnetic, infrared, or semiconductor system, apparatus, or device, or any suitable combination of the foregoing.

Additionally, the Storage Unit 115 can also include a program of instructions for causing the Monitoring Unit 100, the Replication Unit 105, the Recording Unit 110, the Registration Unit 120, the Consumer interface 125, the Access Controller 135, the Display 140 and the Clock 145 to execute the functionality described herein. Alternatively, the Video Capture Device 10 can have a separate storage for storing the program.

Additionally, the Storage Unit 115 includes APIs for each virtualization environment and provider 20 that the Video Capture Device 10 is configured to record. For example, a VM discovery API is used by the Monitoring Unit 100 to discovery new VMs and consoles. There can be a different discovery API for different providers 20 and environments. Additionally, the Replication Unit 105 uses a Console API to create the reflection image of running VM consoles.

APIs can be added into the Storage Unit 115 as they become available.

The Storage Unit 115 also includes the video capture device credentials obtained from a consumer 15.

The Monitoring Unit 100 monitors each virtualization environment via the discovery API. For example, the Monitoring Unit 100 can poll the virtualization environment for all VMs and consoles. Alternatively, the provider 20 can push the information to the Monitoring Unit 100. Additionally, if the VM is secure, the Monitoring Unit 100 accesses the Storage Unit 115 for the video capture device credentials.

Once a VM is identified, the Replication Unit 105 creates an additional instantiation of each console by generating a reflection of the console on a Video Capture Device 10. For example, a VMware vSphere Web Services SDK can be used. The reflected console is displayed on the Display 140. The Display 140 can be a computer monitor such as, but not limited to, a LCD screen.

The Recording Unit 110 records video images of the reflected console. The reflected console appears as an image of the Display 140, e.g., a window. The Recording Unit 110 can use video capturing software. The Recording Unit 110 works in conjunction with a Clock 145 to timestamp the recorded video. As the image is being recorded, the video is stored in the Storage Unit 115. The stored real time video is given a unique identifier. In an embodiment, the identifier includes the name of the VM and timestamp. The videos can be indexed by the name of the VM.

The Registration Unit 120 acts as a user interface to register the consumer to a VM. The Registration Unit 120 can include a graphical user interface with either a form fillable application or drop down menus to obtain information from the virtualization consumer 15. The consumer 15 provides information such as, but not limited to, the name of the owner, Registration Credentials, Video Capture Device Credentials, recorded video storage time (a staleness time), name of VM, and the virtualization provider 20 for the virtualization environment.

The Access Controller 135 authenticates a request to view a recorded video. The Access Controller 135 uses information in the data record(s) from the Storage Unit 115 to authenticate the requester. If the requester is authenticated, a list of recorded real time videos associated with a specific virtual machine is sent to the requester via a Consumer Interface 125. The Consumer Interface 125 is configured to receive a selection of a recorded real time video from the list of recorded real time videos. The selection is forwarded to the Access Controller 135. The selected video is forwarded to the requester via the Consumer Interface 125. The Consumer Interface 125 can be a wireless or wireless transmission and reception device, such as a network card. As depicted in FIG. 2, the Monitoring Unit 100, Replication Unit 105, Recording Unit 110, Registration Unit 120 and Access Controller 135 have been separately depicted; however, the units can be integrated as one controller, processor or control circuit. The controller, processor or control circuit can be a microprocessor, CPU, PAL, PAL, FPGA or ASIC.

FIG. 3 is a flow diagram of an example of a recording method in accordance with an aspect of the disclosure. At step 300, the Monitoring Unit 100 monitors one or more virtualization environments for VM(s) and VM console associated with a registered virtualization consumer.

The Monitoring Unit 100 uses the discovery API associated with virtualization environment. If a VM and VM console is detected ("Y" at decision step 305), a reflection or minor image of the console is generated by the Replication Unit 105 at step 310. If the VM console is secured, the Monitoring Unit 100 can use the registered Security Credentials to discover and/or access the VM console. The Replication Unit 105 uses a console API associated with the virtualization provider to generate the reflection. The reflection is displayed on the Display 140. The reflection appears as a window on the Display 140. At step 315, the Recording Unit 110 records a real time video of the reflection. The Recording Unit 110 can record multiple reflections simultaneously. Each reflection will appear as a separate window on the Display 140. Each real time video is stored in the Storage Unit 115 at step 320.

When a real time video is recorded and stored, the Access Controller 135 can issue a notification to a registered entity that is associated with the virtualization consumer 15. The registration will be described in detail with respect to FIG. 4. The notification can be an email sent to the registered entities email address indicating. However, the notification is not limited to an email. The notification can also be an automated telephone call to a registered telephone number. Additionally, the notification can be a text message sent to a registered device. The notification can include the time that the video was recorded and the name of the VM.

Consumers 15 will pre-register for the recording service. FIG. 4 illustrates a registration process in accordance with an aspect of the disclosure. At step 400 the Virtualization Consumer 15 provides information related to the owner of the VM. The information can include the name of the owner, name of the virtualization environment/provider 20 and names of the VMs associated with the owner and any Security Credentials needed to assess the VM and VM console. The Virtualization Consumer 15 can also register one or more entities that are authorized to view any real time videos of the VM consoles via the Registration Unit 120. At step 405, the Virtualization Consumer 15 identifies the name(s) of the entities and associated a password for each entity. If the Virtualization Consumer 15 has multiple VMs and VM consoles, it can register the same entity for each VM and VM console. Alternatively, the Virtualization Consumer 15 can register different entities for different VMs and VM consoles.

At step 410, the Registration Unit 120 creates a Data Record for the Virtualization Consumer 15. The Data Record is stored in the Storage Unit 115. Once registered, the Data Record is referenced by the Monitoring Unit 100 and the Access Controller 135.

Figure 5:
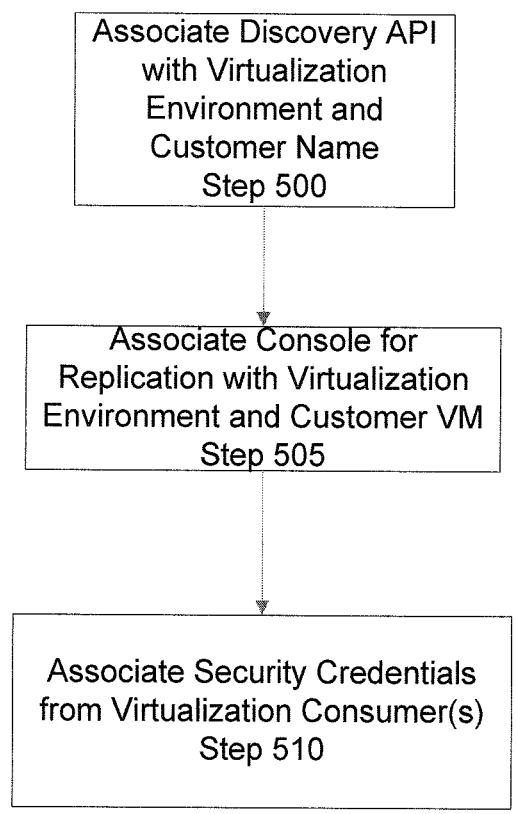
FIG. 5 is a flow diagram of an example of a pre-recording method in accordance with an aspect of the disclosure.

FIG. 5 is a flow diagram of an example of a pre-recording method in accordance with an aspect of the disclosure. As described above, the Monitoring Unit 100 uses discovery APIs associated with a virtualization provider 20 to monitor VMs and VM consoles of a registered consumer and the Replication Unit 105 uses a Console API also associated with the virtualization provider 20 to create the reflection. In an embodiment, these APIs are prestored in the Storage Unit 115. When a new VM is registered via the registration process described above, the Monitoring Unit 100 obtains the appropriate Discovery API associated with the Virtualization provider 20 of the VM at step 500. The Replication Unit 105 obtains the appropriate Console API associated with the Virtualization provider 20 of the VM and VM console at step 505. If the VM and VM console is secure, at step 510, the Monitoring Unit 100 obtains the Security Credentials from the Data Record.

Figure 6:
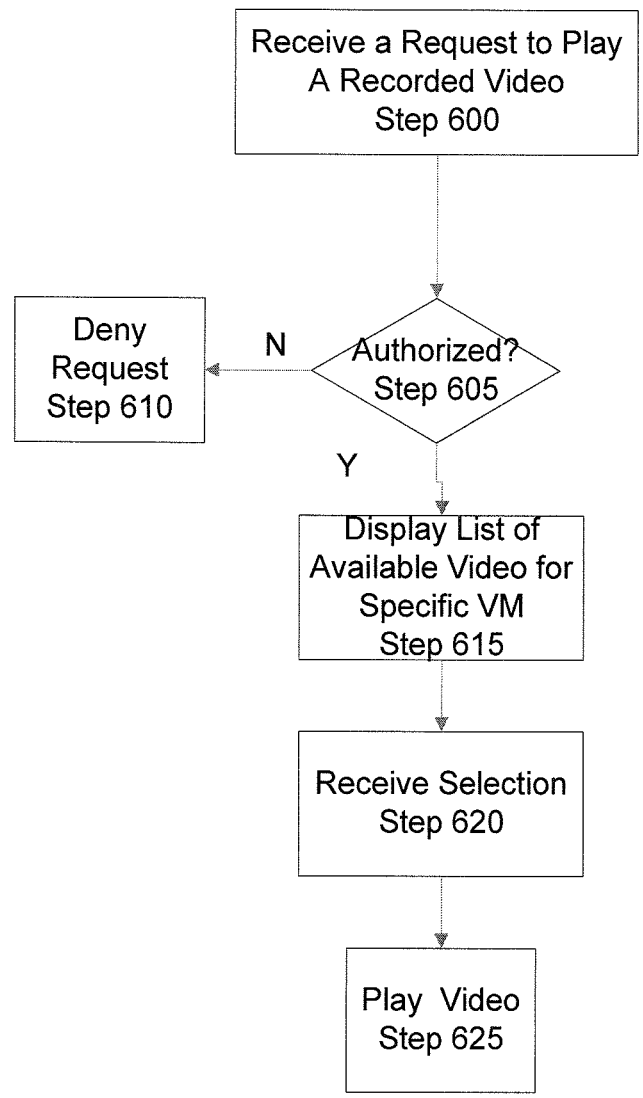
FIG. 6 is a flow diagram of an example of a playback method in accordance with an aspect of the disclosure.

FIG. 6 is a flow diagram of an example of a playback method in accordance with an aspect of the disclosure. At step 600, the Access Controller 135 receives a request to play a recorded video from a requester via the Consumer Interface 125. The Access Controller 135 examines the credentials in the request to determine if the requester is authorized to view the video. In an embodiment, the request includes a requester identifier and a password. In another embodiment, the request can include the name of the VM that the requester would like to view a recorded video for. Furthermore, if the requester received a prior notification of a new video, the request can include the identifier of the video. Alternatively, the request can be a response to the notification. The requester identifier and password is extracted from the request to match with the identifiers and passwords stored in the Data Record from the Storage Unit 115. Additionally, if the name of the VM is included in the request, this infornlation is also extracts for matching.

At decision step 605, the Access Controller 135 determines if the requester is authorized. If the requester is not authorized ("N" at decision step 605), the request is denied at step 610. In an embodiment, the Access Controller 135 issues a denial notification to the requester. This notification can be displayed on a display associated with the device that issued the request.

If the requester is authorized ("Y" at decision step 610), the Access Controller 135 causes a list of available video for the VM to be displayed. The list is sent via the Consumer Interface 125. The list is retrieved from the Storage Unit 115. If the request was a response to a notification of a new video, instead of displaying the list of all available videos, the new video will be played.

At step 620, the Access Controller 135 will receive play selection(s) from the requester via the Consumer Interface 125. The selected video(s) are retrieved and sent to the requester via the Consumer Interface at step 625. In an embodiment, the videos are streamed from the Storage Unit 115 with the Access Controller 135 acting as a relay.

Figure 7:
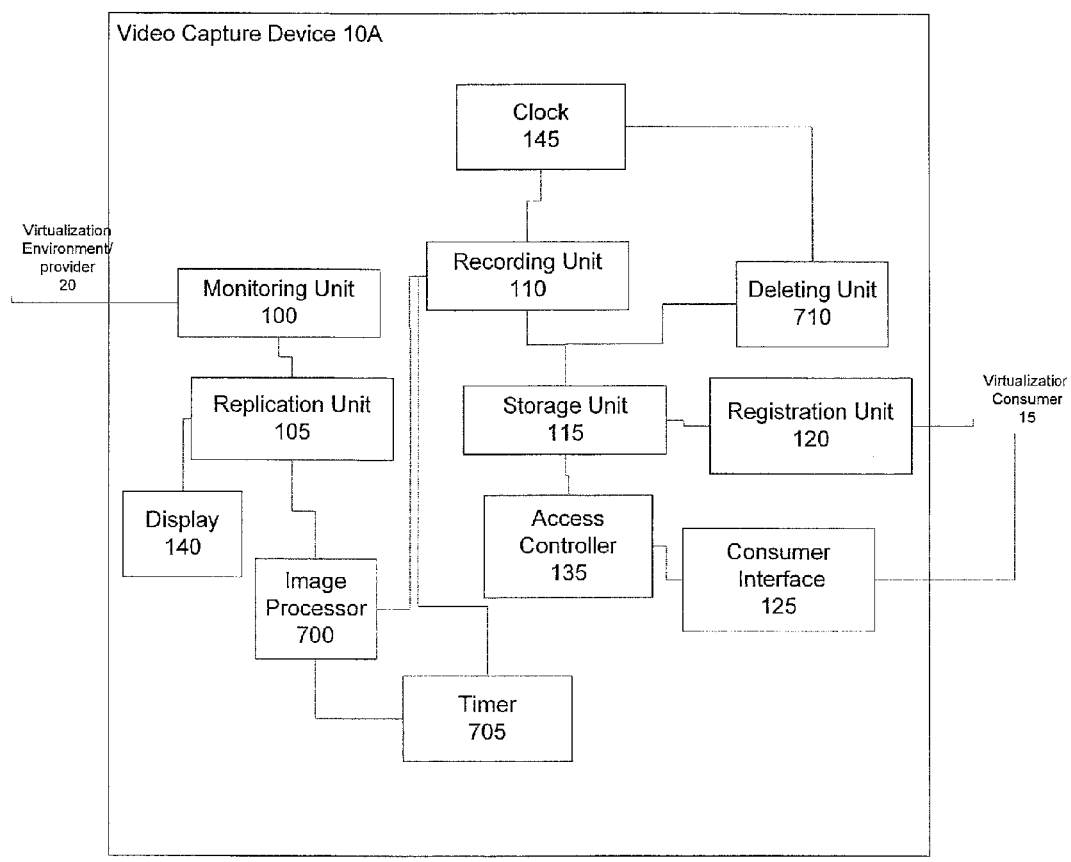
FIG. 7 is a block diagram of another example of a Video Capture Device in accordance with an aspect of the disclosure.

FIG. 7 is a block diagram of another example of a Video Capture Device 10A in accordance with an aspect of the disclosure. The Video Capture Device 10A is similar to the Video Capture Device 10 as depicted in FIG. 2 except that the device includes an Image Processor 700, a Timer 705 and a Deleting Unit or a storage manager 710. The Video Record Device 10A is also configured to analyze the image of the reflected VM console to determine a change and triggers the Recording Unit 110 if a change is detected. This avoids endless recording of videos where there is no change to the image of the reflected VM console. Additionally, Video Capture Device 10A is configured to delete a stored recorded video after a period of time.

The Video Capture Device 10A also includes a Monitoring Unit 100, a Replication Unit 105, a Recording Unit 110, a Storage Unit 115, a Registration Unit 120, a Consumer Interface 125, an Access Controller 135, a Display 140 and a Clock 145. These units are similar to FIG. 2 and will not be described again in detail.

The Image Processor 700 is configured to analyze the image of the reflected VM console and determine when the image changes. Image processing is well known and therefore will not be described in detail herein. The Image Processor 700 is coupled to a Timer 705. The Timer 705 tracks the time between changes in the image. In an embodiment, each time the Image Processor 700 detects a change in the image, a signal is transmitted to the Timer 705. When the first signal is received by the Timer 705, the Timer 705 is set to a predetermined time. The predetermined time can be customized for different consumers 15 via the registration process.

The Timer 705 is then started and counts down to zero, starting from the set predetermined time. Each subsequent signal causes the Timer 705 to reset the time to the predetermined time. Also in an aspect of the disclosure, the first signal is simultaneously transmitted to the Recording Unit 110 and the Recording Unit 110 starts recording the video of the image.

Once started, if the Timer 705 expires, e.g., reaches zero, a signal is transmitted to the Recording Unit 110 and the Recording Unit 110 stops recording the video. In an aspect of the disclosure, the Timer 705 can transmit the signal to the Recording Unit 110.

The Deleting Unit 710 acts as a staleness timer. The Deleting Unit is coupled to the Storage Unit 115 and deletes videos according to a storage policy. The storage policy can be customized for different consumers 15 via the registration process. Alternatively, a default policy can be used, e.g., all videos older than 90 days. Additionally, in an aspect of the disclosure, the consumer 15 can delete a video once viewed.

The Deleting Unit 710 is also coupled to the Clock 145 to obtain the current time. The current time is compared with the time that the recorded video was taken and stored, e.g., timestamp. The result of the comparison is then compared with the storage policy. When the actual storage period equals or exceeds the storage policy, the Deleting Unit 710 deletes the video.

As depicted in FIG. 7, the Image Processor 700, Timer 705 and Deleting Unit 710 have been separately depicted, however, they can be integrated a one controller, processor or control circuit. The controller, processor or control circuit can be a microprocessor, CPU, PAL, PAL, FPGA or ASIC.

Figure 8:
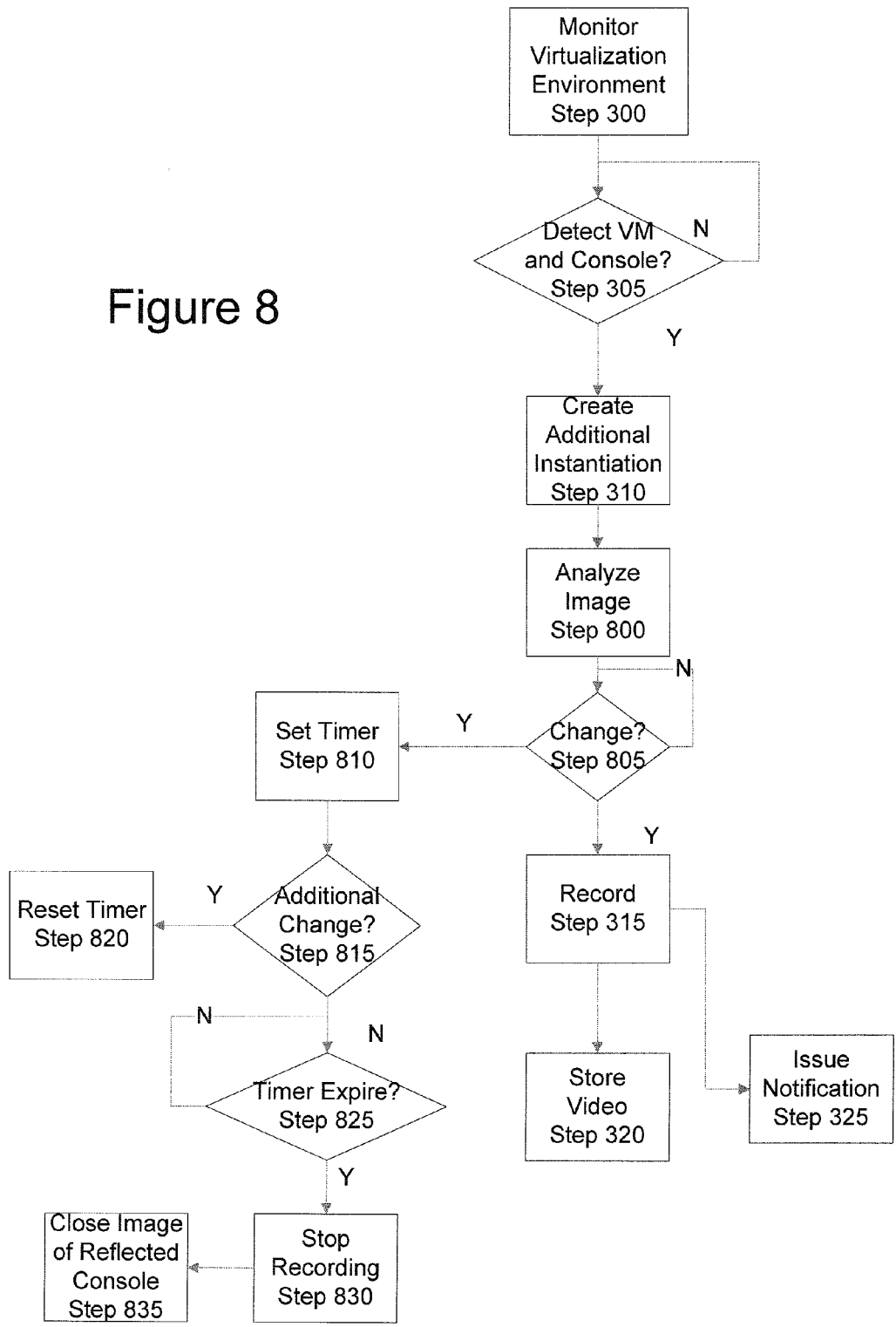
FIG. 8 is a flow diagram of another example of a recording method using the recording device illustrated in FIG. 7 in accordance with an aspect of the disclosure.

FIG. 8 illustrates a recording method using the video capture device 10A according to an aspect of the disclosure. Many of the steps of the method are similar to those described above with respect to FIG. 3 and will not be described again in detail.

At step 300, the Monitoring Unit 100 monitors one or more virtualization environments for VM(s) and VM console associated with a registered virtualization consumer. If a VM and VM console is detected ("Y" at decision step 305), a reflection or mirror image of the console is generated by the Replication Unit 105 at step 310.

Prior to recording the image, the Image Processor 700 analyzes the image at step 800 for a change. If a change is detected based upon the analysis ("Y" at decision step 805), a signal is sent to the Timer 705. The Timer 705 is set to predetermined time at step 810 and started. Additionally, a triggering signal is sent by either the Image Processor 700 or the Timer 705 to the Recording Unit 110 and the image is recorded. The Image Processor 700 continuously analyzes the reflect image of the VM console for changes. Each subsequent change causes the timer to reset. At decision step 815, the Image Processor 700 determines if there is a subsequent change.

If there is a subsequent change ("Y" at decision step 815), a signal is transmitted to the Timer 705 and the Timer 705 is reset at step 820 to same predetermined time. If no subsequent change is detected ("N" at decision step 815), a determination is made if the set time has elapsed, i.e., expired, at decision step 825. If the time expired ("Y" at decision step 825), a termination signal is sent from the Timer 705 to the Recording Unit 110. At step 830, the Recording Unit 110 stops recording the video. At step 835, the image of the reflected VM console is also closed. In another embodiment, step 835 can be delayed for a second predetermined time to avoid restarting the entire process. The reflected VM console would remain open for a second predetermined time and if the Image Processor 700 detected a change within the second predetermined time, the recording of the image would restart. Either the Image Processor 700 or the Timer 705 would transmit a restart signal to the Recording Unit 110.

Similar to the process described in FIG. 3, the recorded video is stored in the Storage Unit 115 at step 320 and a notification is issued by the Access Controller 135 at step 325.

As will be appreciated by one skilled in the art, aspects of the present disclosure may be embodied as a system, method or computer program product. Aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be "Unit (s)", "Controller(s)" and "Processor(s)" Furthermore, aspects of the present disclosure may take the form of a computer program product embodied in one or more computer readable media having computer readable program code embodied thereon.

Figure 9:
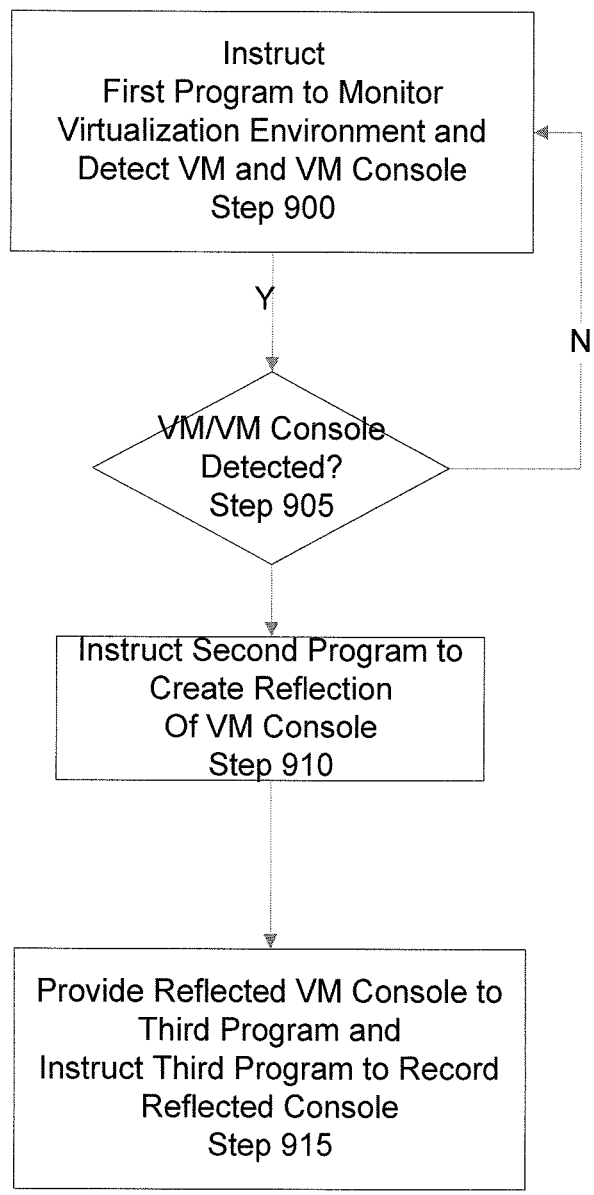
FIG. 9 illustrates a flow chart for an example of a master program in accordance with an aspect of the disclosure.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. The program can be a single program executing the steps described herein. Additionally, the method described herein can be performed by multiple different programs that is controlled be a master program. The different programs can be included in the same computer readable medium. Alternatively, each program can be on a different computer readable medium. The master program calls or instructs each individual or sub-program to perform the steps described herein. FIG. 9 illustrates a flow chart for an example of a master program in accordance with aspects of the present disclosure. The master program can instruct a first program to monitor at least one virtualization environment and detect at least one new virtual machine and associated console (step 900). The first program can be a discovery API. The master program receives the detection result will triggers a call or instruction to a second program if a VM/VM console is detected (steps 905/910). The second program can create an additional instantiation of each console by generating a reflection of the console on a video capture device based upon the detection. Once the master program determines that the additional instantiation has been created and provides the additional instantiation to a third program (step 915). The master program can instruct a third program to record a real-time video of an image of the additional instantiation of each console on the video capture device when the reflection is created (step 915). The third program can be video capturing software.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terms "Unit(s)" "Controller(s)" and "Processor(s)" as may be used in the present disclosure may include a variety of combinations of fixed and/or portable computer hardware, software, peripherals, and storage devices. The system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud).

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for monitoring a virtual machine comprising:
   monitoring a virtualization environment, wherein the virtualization environment is provided by a virtualization provider that provides a plurality of virtual machines,
   detecting a new virtual machine and a console associated with the virtual machine,
   wherein the console associated with the virtual machine is used to access and perform operations of the virtual machine;
   creating, responsive to detecting the console associated with the virtual machine, an additional instantiation of the console by generating a reflection of the console on a video capture device; and
   recording a real time video of usage of the console by capturing an image of the additional instantiation of the console on the video capture device,
   wherein the monitoring comprises using a discovery API associated with the virtualization provider of the virtualization environment to query the virtualization environment for virtual machines and consoles,
   wherein each virtual machine and console is owned by a respective virtualization consumer,
   wherein creating the additional instantiation of the console comprises using a console software API associated with the virtualization provider to generate the reflection,
   wherein detecting the new virtual machine and the console associated with the virtual machine is performed independent of an agent installed on the virtual machine to facilitate the detecting,
   wherein creating the additional instantiation of the console associated with the virtual machine is performed independent of an agent installed on the virtual machine to facilitate the creating, and
   wherein recording the real time video usage of the console associated with the virtual machine is per independent of an agent installed on the virtual machine to facilitate the recording.

2. The method for monitoring a virtual machine according to claim 1, wherein the monitoring comprises using the discovery API associated with the virtualization provider for the virtualization environment and security credentials provided by the virtualization consumer to query the virtualization environment for virtual machines and consoles associated with the virtualization consumer.

3. The method for monitoring a virtual machine according to claim 1, further comprising detecting a first change in the image of the additional instantiation of the console, wherein the recording is triggered by the detection.

4. The method for monitoring a virtual machine according to claim 3, further comprising:
  setting a change timer to a preset value after the detection of the first change; and
  resetting the change timer when a second change in the image of the additional instantiation of the console is subsequently detected,
  wherein the recording of the image of the additional instantiation of the console is stopped if the change timer expires.

5. The method for monitoring a virtual machine according to claim 1, further comprising storing the recorded real time video of the image.

6. The method for monitoring a virtual machine according to claim 5, wherein the recorded real time video of the image is associated with an identifier.

7. The method for monitoring a virtual machine according to claim 5, wherein the recorded real time video of the image is timestamped.

8. The method for monitoring a virtual machine according to claim 5, further comprising:
  receiving a request to view a recorded real time video of the image from a requester; and authenticating the requester,
  wherein if the requester is authenticated, the method further comprises causing a list of recorded real time videos associated with a specific virtual machine to he displayed.

9. The method for monitoring a virtual machine according to claim 5, further comprising:
  receiving a selection of a recorded real time video from the list of recorded real time videos; and
  providing the selected recorded real time video to the requester.

10. The method for monitoring a virtual machine according to claim 5, further comprising:
  registering an entity authorized to request a real time video for a specific virtual machine.

11. The method for monitoring a virtual machine according to claim 10, further comprising:
  issuing a notification to the entity when a real time video is stored for the specific virtual machine.

12. The method for monitoring a virtual machine according to claim 5,
  wherein a plurality of virtual machines and consoles are detected, and
  wherein images of each additional instantiation of the consoles are separately recorded.

13. The method for monitoring a virtual machine according to claim 5, further comprising:
  deleting the recorded real time videos after a period of time.

14. The method according to claim 1, wherein the virtualization environment includes a first virtualization environment provided by a first virtualization provider,
  wherein the monitoring comprises:
  monitoring the first virtualization environment using a first discovery API associated with the first virtualization provider of the first virtualization environment to query the first virtualization environment for virtual machines and consoles;
  monitoring a second virtualization environment that is provided by a second virtualization provider that is different from the first virtualization provider,
  wherein monitoring the second virtualization environment comprises using a second discovery API that is different from the first discovery API, and that is associated with the second virtualization provider of the second virtualization environment to query the second virtualization environment for virtual machines and consoles.

15. A virtual image capture device comprising:
  a console monitor to monitor a virtualization environment to detect a new virtual machine console associated with a virtual machine, wherein the virtualization environment is provided by a virtualization provider that provides a plurality of virtual machines,
  wherein the virtual machine console associated with the virtual machine is used to access and perform operations of the virtual machine;
  a replication unit to create, responsive to detecting the virtual machine console associated with the virtual machine, an additional instantiation of the detected virtual machine console by generating a reflection of the virtual machine console; and
  a recording unit to record a real time video of usage of the virtual machine console by capturing an image of the reflected console,
  wherein the monitoring comprises using a discovery API associated with the virtualization provider of the virtualization environment to query the virtualization environment for virtual machine consoles,
  wherein each virtual machine console is owned by a respective virtualization consumer,
  wherein creating the additional instantiation of the virtual machine console comprises using a console software API associated with the virtualization provider to generate the reflection,
  wherein detecting the new virtual machine console associated with the virtual machine is performed independent of an agent installed on the virtual machine to facilitate the detecting,
  wherein creating the additional instantiation of the virtual machine console associated with the virtual machine is performed independent of an agent installed on the virtual machine to facilitate the creating, and
  wherein recording the real time video usage of the virtual machine console associated with the virtual machine is performed independent of an agent installed on the virtual machine to facilitate the recording.

16. The virtual image capture device according to claim 15, further comprising a storage device configured to store the recorded real time video.

17. The virtual image capture device according to claim 15, wherein the recorded real time video is stored.

18. The virtual image capture device according to claim 16, further comprising:
  a registration unit configured to register an entity authorized to request a real time video for a specific virtual machine.

19. The virtual image capture device according to claim 18, further comprising:
  an access controller configured to authenticate a request to view a recorded video from a requester,
  wherein if the requester is authenticated, a list of recorded real time videos associated with a specific virtual machine is displayed and a recorded real time video from the list of recorded real time videos is selected,
  wherein the selected recorded real time video is provided to the requester.

20. A computer program product comprising:
  a non-transitory computer readable storage medium having computer readable program code embodied therewith, the computer readable program code comprising:

computer readable program code to monitor a virtualization environment,
wherein the virtualization environment is provided by a virtualization provider that provides a plurality of virtual machines;
computer readable program code to detect a new virtual machine and a console associated with the virtual machine,
wherein the console associated with the virtual machine is used to access and perform operations of the virtual machine;
computer readable program code to create, responsive to detecting the console associated with the virtual machine, an additional instantiation of the console by generating a reflection of the console on a video capture device; and
computer readable program code to record a real time video of usage of the console by capturing an image of the additional instantiation of the console on the video capture device,
wherein the monitoring comprises using a discovery APT associated with the virtualization provider of the virtualization environment to query the virtualization environment for virtual machines and consoles,
wherein each virtual machine and console is owned by a respective virtualization consumer,
wherein creating the additional instantiation of the console comprises using a console software APT associated with the virtualization provider to generate the reflection,
wherein detecting the new virtual machine and the console associated with the virtual machine is performed independent of an agent installed on the virtual machine to facilitate the detecting,
wherein creating the additional instantiation of the console associated with the virtual machine is performed independent of an agent installed on the virtual machine to facilitate the creating, and
wherein recording the real time video usage of the console associated with the virtual machine is performed independent of an agent installed on the virtual machine to facilitate the recording.

21. A computer program product comprising:
a non-transitory computer readable storage medium having computer readable program code embodied therewith, the computer readable program code comprising:
computer readable program code to instruct a first program to monitor a virtualization environment provided by a virtualization provider that provides a plurality of virtual machines and to detect a new virtual machine and a console associated with the virtual machine,
wherein the console associated with the virtual machine is used to access and perform operations of the virtual machine;
computer readable program code to instruct a second program to create, responsive to detecting the console associated with the virtual machine, an additional instantiation of the console by generating a reflection of the console on a video capture device based upon the detection; and
computer readable program code to instruct a third program to record a real time video of usage of the console by capturing an image of the additional instantiation of the console on the video capture device when the reflection is created,
wherein the monitoring comprises using a discovery API associated with the virtualization provider of the virtualization environment to query the virtualization environment for virtual machines and consoles,
wherein each virtual machine and console is owned by a respective virtualization consumer,
wherein creating the additional instantiation of the console comprises using a console software API associated with the virtualization provider to generate the reflection,
wherein detecting the new virtual machine and the console associated with the virtual machine is performed independent of an agent installed on the virtual machine to facilitate the detecting,
wherein creating the additional instantiation of the console associated with the virtual machine is performed independent of an agent installed on the virtual machine to facilitate the creating, and
wherein recording the real video usage of the console associated with the virtual machine is performed independent of an agent installed on the virtual machine to facilitate the recording.

* * * * *